(12) United States Patent
Bennett (10) Patent No.: US 6,850,384 B1
(45) Date of Patent: Feb. 1, 2005

(54) DISK DRIVE COMPRISING OSCILLATORS AND COUNTERS FOR SENSING CURRENT IN A VOICE COIL MOTOR

(75) Inventor: George J. Bennett, Murrieta, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 145 days.

(21) Appl. No.: 10/376,821

(22) Filed: Feb. 28, 2003

(51) Int. Cl.[7] .......................... G11B 21/02; G11B 5/596
(52) U.S. Cl. .................. 360/75; 360/78.01; 360/78.04
(58) Field of Search .................. 360/46, 67, 78.01, 360/78.04, 75, 77.02; 318/293, 256, 280, 560, 565, 568.16

(56) References Cited

U.S. PATENT DOCUMENTS

5,838,515 A   11/1998   Mortazavi et al.
5,898,283 A   4/1999    Bennett
6,084,378 A   7/2000    Carobolante

*Primary Examiner*—Sinh Tran
*Assistant Examiner*—Jason Olson
(74) *Attorney, Agent, or Firm*—Milad G. Shara, Esq.; Won Tae C. Kim, Esq.; Howard H. Sheerin, Esq.

(57) ABSTRACT

A disk drive is disclosed comprising a voice coil motor (VCM) driver including an H-bridge driver having a first sense resistor connected in series with a supply voltage and a second sense resistor connected in series with ground. First and second amplifiers amplify the voltages across the first and second sense resistors, wherein the output of the amplifiers drive respective first and second oscillators. A counter processes the frequency signals output by the oscillators to generate a digital representation of the current flowing through the voice coil of the VCM.

12 Claims, 7 Drawing Sheets

DISK DRIVE COMPRISING OSCILLATORS AND COUNTERS FOR SENSING CURRENT IN A VOICE COIL MOTOR

CROSS REFERENCE TO RELATED APPLICATIONS AND PATENTS

This application is related to co-pending U.S. patent application Ser. No. 10/376,819 entitled "DISK DRIVE COMPRISING CURRENT SENSE CIRCUITRY FOR A VOICE COIL MOTOR" filed on Feb. 28, 2003, the disclosure of which is incorporated herein by reference.

BACKGROUND OF THE INVENTION

1. Field of the Invention

The present invention relates to disk drives for computer systems. More particularly, the present invention relates to a disk drive comprising oscillators and counters for sensing current in a voice coil motor.

2. Description of the Prior Art

Figure 1:
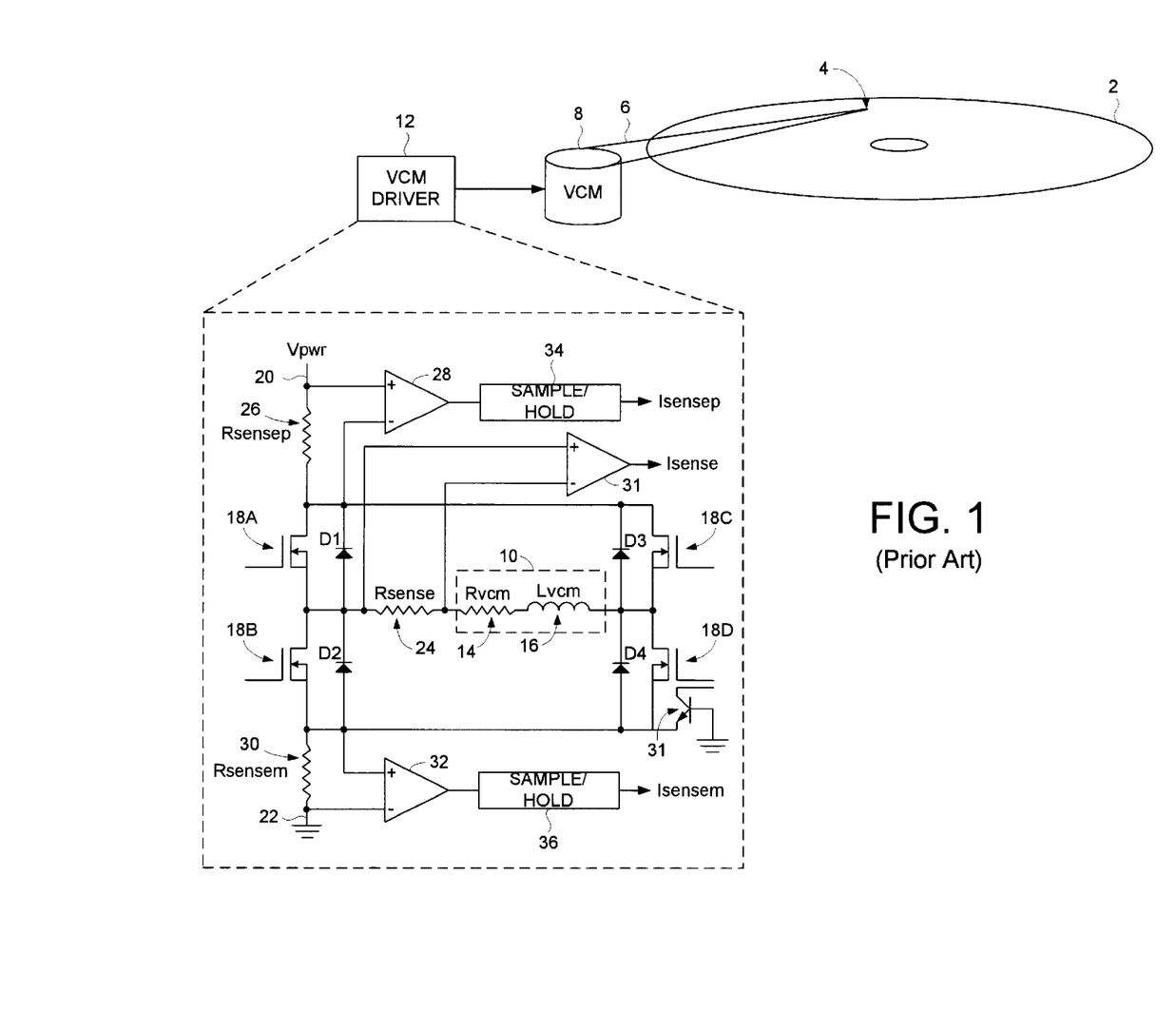
FIG. 1 shows prior art techniques for sensing the current flowing through the voice coil of a disk drive VCM.

FIG. 1 shows a prior art disk drive comprising a disk 2 rotated about a center axis by a spindle motor (not shown). A head 4 attached to a distal end of an actuator arm 6 is actuated radially over the disk 2 by a voice coil motor (VCM) 8. The VCM 8 comprises a voice coil 10 which interacts with permanent magnets of a VCM yoke in order to rotate the actuator arm 6 about a pivot. The VCM 8 is typically driven in either a linear mode or in a pulse width modulated (PWM) mode. In addition, the motion of the VCM 8 may be controlled using a current feedback loop by sensing the amount of current flowing through the voice coil 10 which is proportional to the amount of torque applied to the actuator arm 6.

FIG. 1 also shows a VCM driver 12 comprising a conventional H-bridge driver for driving the voice coil 10 shown as a resistance Rvcm 14 and an inductance Lvcm 16. The H-bridge driver comprises a plurality of driver switches 18A–18D for selectively connecting the ends of the voice coil 10 to a supply voltage 20 or to ground 22 depending on the desired direction of rotation. A plurality of diodes D1–D4 protect the driver switches 18A–18D from flyback currents generated from driving an inductive load.

In order to control the motion of the VCM 8 accurately using a current feedback loop it is important to measure the total integral of the current flowing through the voice coil 10. Several problems arise when attempting to use the conventional techniques for sensing the current flowing through the voice coil 10 when driven in a PWM mode. Referring again to FIG. 1, if a single sense resistor Rsense 24 in series with the voice coil 10 is used to sense current, the PWM voltage appears on both sides of the resistor Rsense 24 at several volts at very high slew rates. This chop voltage (a square wave) must be rejected by sense amplifier 31 so that the very small voltage across Rsense 24 can be accurately measured. This high frequency AC voltage capacitively couples into the sense amplifier 31, and creates offsets and nonlinearities which distort the current sense measurement. This problem exacerbates as the frequency of the PWM increases.

Another prior art current sensing technique uses a sense resistor Rsensep 26 in series with the supply voltage 20 and an amplifier 28, or a sense resistor Rsensem 30 in series with ground 22 and an amplifier 32. This technique avoids the common mode voltage problem associated with sense resistor Rseries 24, however, it also leads to other problems related to inductive flyback currents. Assume, for example, that current is flowing to the right through the voice coil 10. Initially, driver switches 18A and 18D are on, allowing Vpwr 20 to source the current through the sense resistors Rsensep 26 or Rsensem 30. Driver switch 18A is driven by a PWM signal, while driver switch 18D is left on continually. When the PWM signal turns driver switch 18A off, the inductive load keeps current flowing to the right in the coil regardless of the voltage applied because of the magnetic flux stored in the coil and its magnetic structure. This inductive current can cause diode D2 or driver switch 18B to conduct current, depending on the ratio of impedances. Since current is also flowing through switch 18D, the flyback current momentarily cancels the current through sense resistor Rsensem 30, which can distort the current sense measurement by creating a blank spot in the voltage waveform. Additionally, if the two halves of the H-bridge are switched alternately, flyback current from the inductive current can drive the voltage at the top of sense resistor Rsensem 30 below ground. When this happens, substrate parasitic transistors (shown as parasitic transistor 31 in FIG. 1) are activated, drawing current from elsewhere in the driver circuitry in a random manner, both distorting the current measurement with this additional current and disrupting operation of the driver circuitry.

Regardless of how the H-bridge PWM switching is timed, shootthrough currents (caused by a brief simultaneous conduction between driver switches 18A and 18B or driver switches 18C and 18D) or gate charge injections can also create false values for current that distort the true measurement. These problems are generally avoided using sample/hold circuits 34 and 36, which sample the voltage across the resistors 26 and 30 at a point in the PWM chop cycle where distortions due to flyback, shootthrough, switching, or diode conduction, do not occur. However, the sampling process adds delay to the loop. Additionally, an abrupt change from a large current to a small current leaves a time related sample distortion in the waveform that can be larger than the actual voltage value corresponding to the small current. The control system spends time responding to these spurious distortions which cause unwanted motion in the VCM. Still further, the sense amplifiers 28 and 32 must be designed such that their inputs can be driven below ground, or above the power supply, respectively, in order to sense current of all polarities. Sensing current above or below the power supply rails significantly increases the circuit complexity of a monolithic IC sense amplifier due to substrate current injection, which also removes current from the sense resistor in a nonlinear manner.

There is, therefore, a need to accurately sense the current flowing through the voice coil of disk drive VCM in order to implement a current feedback loop while driving the VCM in a PWM mode.

SUMMARY OF THE INVENTION

The present invention may be regarded as a disk drive comprising a disk, an actuator arm, a head connected to a distal end of the actuator arm, a voice coil motor (VCM) comprising a voice coil, the VCM for rotating the actuator arm about a pivot to actuate the head radially over the disk, and a VCM driver. The VCM driver comprises an H-bridge driver comprising a plurality of driver switches for driving current from a supply voltage through the voice coil to ground. A first sense resistor is connected in series between the supply voltage and at least one of the driver switches, and a first amplifier amplifies a voltage across the first sense resistor to generate a first sense signal. A second sense resistor is connected in series between at least one of the driver switches and ground, and a second amplifier amplifies a voltage across the second sense resistor to generate a second sense signal. A first oscillator generates a first frequency signal in response to the first sense signal, and a second oscillator generates a second frequency signal in response to the second sense signal. A first counter counts periods in a reference frequency, the first frequency signal, and the second frequency signal, and an output of the first counter represents a current flowing through the voice coil.

In one embodiment, the output of the first counter represents a difference between the reference frequency and the first and second frequency signals.

In another embodiment, the VCM driver further comprises pulse width modulated (PWM) circuitry responsive to the output of the first counter for generating a PWM signal for controlling the driver switches. In one embodiment, current flows through the first sense resistor and the voice coil while the PWM signal is in a first state, and current flows through the second sense resistor and the voice coil while the PWM signal is in a second state. The first counter is responsive to the first frequency signal while the PWM signal is in the first state and to the second frequency signal while the PWM signal is in the second state. The VCM driver further comprises a second counter responsive to at least the first frequency signal while the PWM signal is in the second state. An output of the second counter is used to cancel an offset in the measured current flowing through the voice coil. In one embodiment, the output of the second counter is used to adjust the first and second sense signals.

In one embodiment, the first counter comprises a first up counter responsive to the first frequency signal while the PWM signal is in the second state, the first up counter for counting the number of periods in the first frequency signal over a period of the PWM signal. The first counter further comprises a first down counter responsive to the first frequency signal, wherein an output of the first up counter is loaded into the first down counter. The first counter further comprises a second up counter, responsive to the second frequency signal while the PWM signal is in the first state, the second up counter for counting the number of periods in the second frequency signal over a period of the PWM signal. The first counter further comprises a second down counter responsive to the second frequency signal, wherein an output of the second up counter is loaded into the second down counter. An output of the first down counter and an output of the second down counter are combined to generate the output of the first counter in order to compensate for a difference between the operating characteristics of the first and second oscillators.

The present invention may also be regarded as a method of operating a disk drive, the disk drive comprising a disk, an actuator arm, a head connected to a distal end of the actuator arm, a voice coil motor (VCM) comprising a voice coil for rotating the actuator arm about a pivot to actuate the head radially over the disk, and an H-bridge driver comprising a plurality of driver switches for driving current from a supply voltage through the voice coil to ground. A voltage across a first sense resistor is amplified to generate a first sense signal, the first sense resistor being connected in series between the supply voltage and at least one of the driver switches. A voltage across a second sense resistor is amplified to generate a second sense signal, the second sense resistor being connected in series between at least one of the driver switches and ground. A first frequency signal is generated in response to the first sense signal, and a second frequency signal is generated in response to the second sense signal. Periods of the reference frequency, the first frequency signal, and the second frequency signal, are counted to generate a first count representing a current flowing through the voice coil.

DESCRIPTION OF THE PREFERRED EMBODIMENTS

Figure 2:
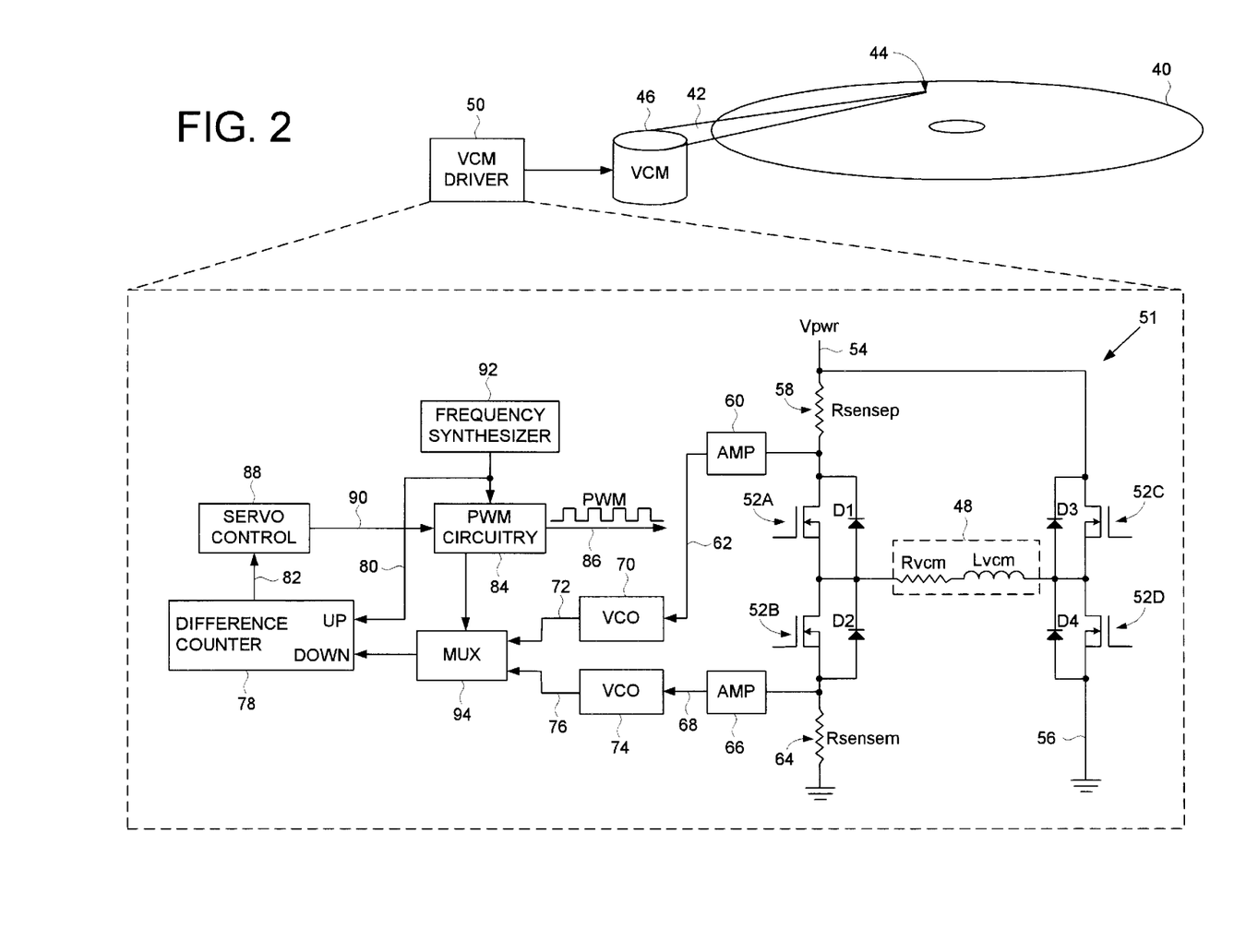
FIG. 2 shows a disk drive according to an embodiment of the present invention employing a first and second oscillator and a counter for converting a current sense voltage into a digital value for processing by a servo control system.

FIG. 2 shows a disk drive comprising a disk 40, an actuator arm 42, a head 44 connected to a distal end of the actuator arm 42, a voice coil motor (VCM) 46 comprising a voice coil 48, the VCM 46 for rotating the actuator arm 42 about a pivot to actuate the head 44 radially over the disk 40, and a VCM driver 50. The VCM driver 50 comprises an H-bridge driver 51 comprising a plurality of driver switches 52A–52D for driving current from a supply voltage 54 through the voice coil 48 to ground 56. A first sense resistor 58 is connected in series between the supply voltage 54 and at least one of the driver switches 52A–52D, and a first amplifier 60 amplifies a voltage across the first sense resistor 58 to generate a first sense signal 62. A second sense resistor 64 is connected in series between at least one of the driver switches 52A–52D and ground 56, and a second amplifier 66 amplifies a voltage across the second sense resistor 64 to generate a second sense signal 68. A first oscillator 70 generates a first frequency signal 72 in response to the first sense signal 62, and a second oscillator 74 generates a second frequency signal 76 in response to the second sense signal 68. A first counter 78 counts periods in a reference frequency 80, the first frequency signal 72 and the second frequency signal 76, and an output 82 of the first counter 78 represents a current flowing through the voice coil 48.

In the embodiment of FIG. 2, the VCM driver 50 further comprises pulse width modulated (PWM) circuitry 84 responsive to the output 82 of the first counter 78 for generating a PWM signal 86 for controlling the driver switches 52A–52D. For example, a servo control circuit 88 may subtract the output of the counter 82 (the current flowing through the voice coil 48) from a target current to generate a control signal 90 applied to the PWM circuitry 84 in order to adjust the duty cycle of the PWM signal 86. The reference frequency 80 is generated by a frequency synthesizer 92 using any suitable circuitry.

Also in the embodiment of FIG. 2, the output 82 of the first counter 78 represents a difference between the reference frequency 80 and the first and second frequency signals 72 and 76 (the first counter 78 is therefore a difference counter 78). A multiplexer 94 applies either the first frequency signal 72 or the second frequency signal 76 (depending on the state of the PWM signal 86) to a DOWN input of the first counter 78, and the reference frequency 80 is applied to the UP input of the first counter 78.

Any suitable circuitry may be employed to implement the amplifiers 60 and 66 in FIG. 2, including amplifiers 28 and 32 and sample/hold circuits 34 and 36 employed in the prior art disk drive shown in FIG. 1. In an alternative embodiment, the amplifiers 60 and 66 in FIG. 2 are implemented using circuitry disclosed in the above referenced patent application entitled, "DISK DRIVE COMPRISING CURRENT SENSE CIRCUITRY FOR A VOICE COIL MOTOR".

Figure 3:
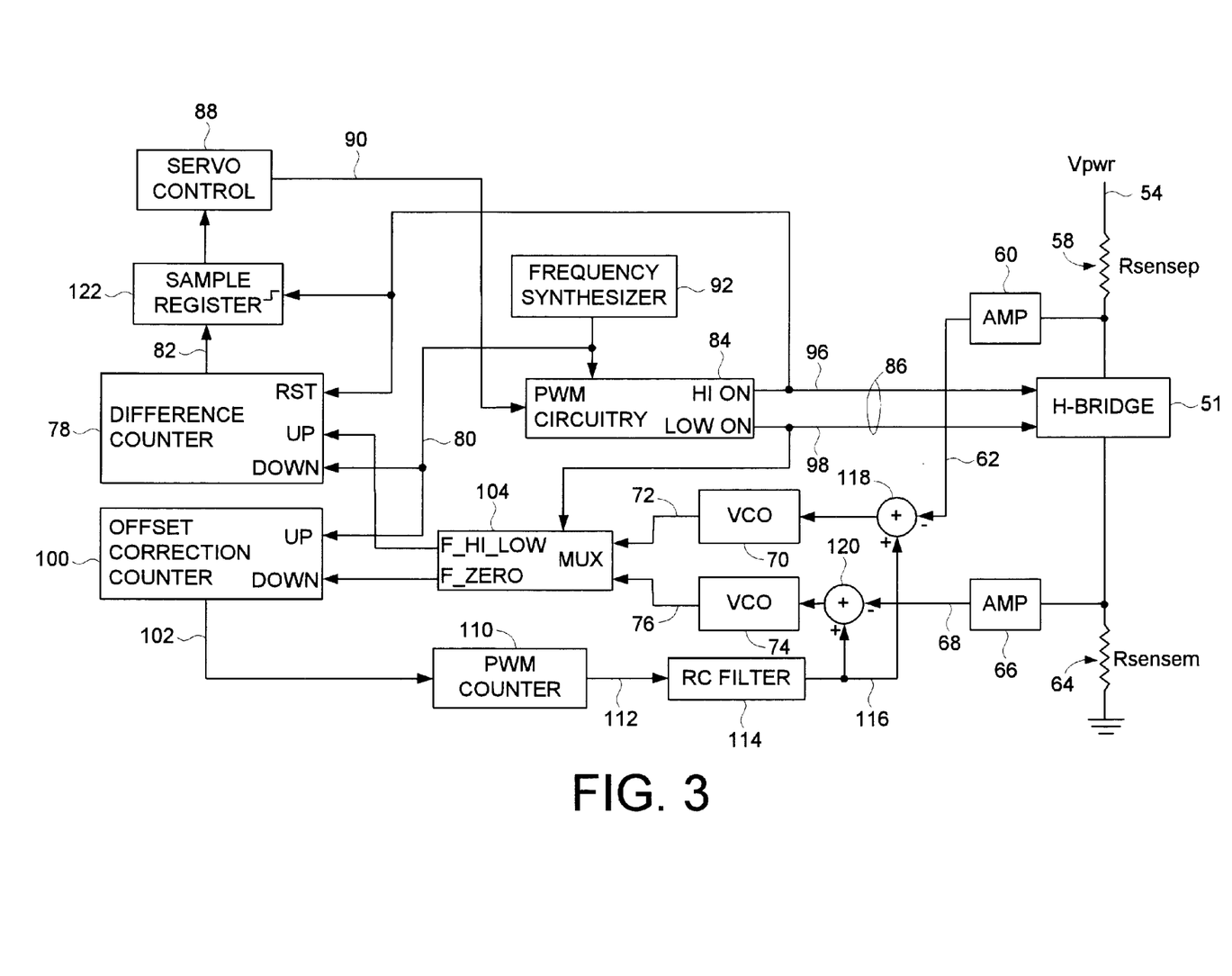
FIG. 3 shows an embodiment wherein a second counter is used to cancel an offset in the current sense measurement.

FIG. 3 shows an embodiment of the present invention wherein the VCM driver 50 comprises a second counter, an offset correction counter 100, used to cancel offsets or drift in the current sense measurement. In this embodiment, current flows through the first sense resistor 58 and the voice coil 48 while the PWM signal 86 is in a first state (HI ON signal 96 is high and LOW ON signal 98 is low), and current flows through the second sense resistor 64 and the voice coil 48 while the PWM signal 86 is in a second state (HI ON signal 96 is low and LOW ON signal 98 is high). While the PWM signal 86 is in the first state, the first frequency signal 72 represents the current flowing through the first sense resistor 58 plus a zero-level offset of the first amplifier 60 and first oscillator 70, and the second frequency signal 76 represents only the zero-level offset of the second amplifier 66 and second oscillator 74. During the first state, the multiplexer 104 routes the zero-level offset frequency 76 to the offset correction counter 100 via its output F_ZERO, and the zero-level offset plus current frequency 72 to the UP input of the difference counter 78 via its output F_HI_LOW. When the PWM signal 86 transitions to the second state (after commutating the H-bridge 51), the current flow switches from the first sense resistor 58 to the second sense resistor 64. During the second state, the first frequency signal 72 represents only the zero-level offset of the first amplifier 60 and first oscillator 70, and the second frequency signal 76 represents the current flowing through the second sense resistor 64 plus the zero-level offset of the second amplifier 66 and the second oscillator 74. Multiplexer 104 swaps the input frequencies 72,76 so that the difference counter 78 is responsive to the second frequency signal 76, which again contains the zero-level offset plus current frequency, while offset correction counter 100 is responsive to the first frequency signal 72 which contains only the zero-level offset frequency. Difference counter 78 is therefore responsive to the offset plus current frequencies over an entire PWM cycle, while offset correction counter 100 is responsive to only the zero-level offset frequencies over the entire PWM cycle. Since the offset correction counter 100 now contains the difference in counts between the reference frequency 80 and the zero-level offset frequencies of the first and second oscillators 70 and 74, an output 102 of the offset correction counter 100 is used to cancel offsets in the measured current flowing through the voice coil 48 by driving the difference between the zero-level offset frequencies and the reference frequency 80 to zero. After adjusting the zero-level offset frequencies, the output 82 of the difference counter 78 represents the true current in the VCM coil 48. In the embodiment of FIG. 3, the output 102 of the offset correction counter 100 is used to adjust the first and second sense signals 62 and 68. However, the offset in the current sense measurement may be canceled in any suitable manner, such as subtracting the output 102 of the offset correction counter 100 from the output 82 of the difference counter 78.

The offset correction counter 100 in FIG. 3 is not reset so that any difference in frequency will cause a continual change in total count, equivalent to integrating the frequency difference between the reference frequency 80 and the zero-level frequency output by F_ZERO of Multiplexer 104. The output 102 of the offset correction counter 100 is loaded into a PWM counter 110 on each cycle of the PWM counter 110 in order to adjust the duty cycle of a PWM signal 112. An RC filter 114 filters the PWM signal 112 to generate an offset value 116 used to adjust the sense signals 62 and 64 at adders 118 and 120. The integrating operation of the offset correction counter 100 thus forces the zero-level frequencies of the first and second frequency signals 72 and 76 to match the reference frequency 80 during the zero-level intervals thereby canceling any offsets in the current sense measurement.

In an alternate embodiment, a reset is added to the offset correction counter 100 to replace the integration action with a proportional count. The proportional count is sampled just before the reset takes place. Although this embodiment only reduces the error (as opposed to totally eliminate it when configured as an integrator), a proportional count provides a faster response due to the proportional type control loop.

Once the offsets have been canceled, the difference between the reference frequency 80 and the first and second frequency signals 72 and 76 during the intervals that current flows through the respective sense resistors 58 and 64 represents the true measurement of current flowing through the voice coil 48. The multiplexer 104 applies the first frequency signal 72 to the UP input of the difference counter 78 while the PWM signal 86 is in the first state (current flowing through the first sense resistor 58), and applies the second frequency signal 72 to the UP input of the difference counter 78 while the PWM signal 86 is in the second state (current flowing through the second sense resistor 64). The reference frequency 80 is applied to the DOWN input of the difference counter 78, and the output 82 of the difference counter 78 (the difference in frequency) is sampled by sample counter 122 on each period of the PWM signal 86.

Figure 4A:
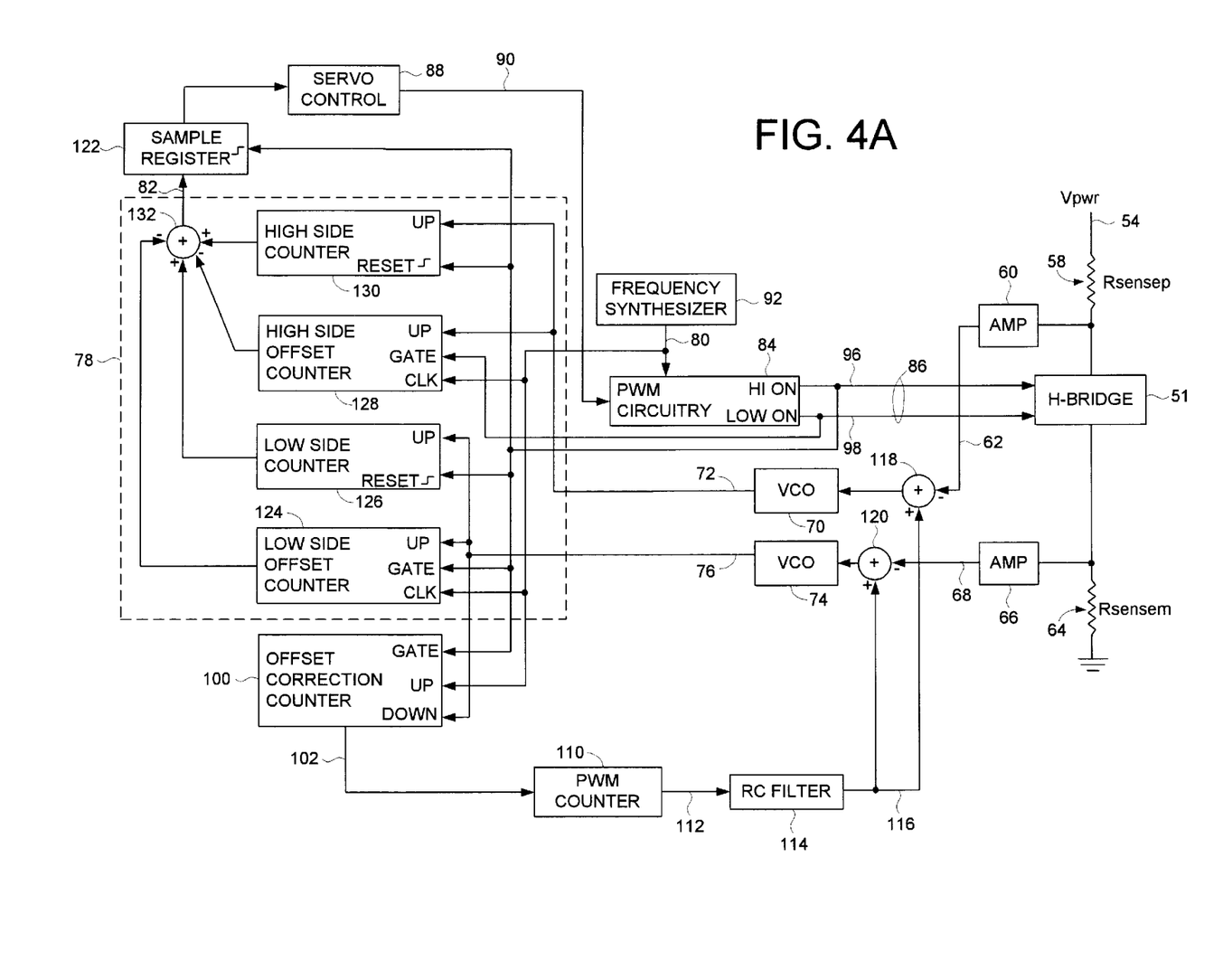
FIGS. 4A and 4B show embodiments of the present invention which compensate for the difference in operating and drift characteristics between the first and second oscillators.

The embodiment of FIG. 3 assumes the first and second oscillators 70 and 74 exhibit the same operating and drift characteristics (frequency versus control input) which would typically be the case if the analog portion of the circuitry was all located in a common integrated circuit. FIG. 4A shows an embodiment of the present invention which compensates for variance in the operating and drift characteristics between the first and second oscillators 70 and 74. In this embodiment, the offset correction counter 100 is responsive only to the second frequency signal 76 and only during the interval when current is not flowing through the second sense resistor 64. In an alternative embodiment, the offset correction counter 100 is responsive only to the first frequency signal 72 during the interval when current is not flowing through the first sense resistor 58. Two additional offset counters 124 and 128 have been added to the difference counter 78 that provide separate offset correction for each of the current sense circuits in the following manner. The offset correction counter 100 in the embodiment of FIG. 4A is modified so that it reconstructs the offset count using only part of a PWM cycle instead of an entire PWM cycle through use of an additional internal counter, and by adding a gate input. The offset correction counter 100 is enabled by applying the HI ON signal 96 to a GATE input so that the UP count is active only during the zero-level interval of the second amplifier 66. The offset correction counter 100 thus provides general correction to keep both oscillators 70 and 74 approximately centered at the reference frequency 80, while the difference counter 78 provides offset correction specific to each of the first and second current sense circuits. In the embodiment of FIG. 4A, the difference counter 78 comprises a first up counter (low side offset counter) 124 responsive to the second frequency signal 76 only while the PWM signal 86 is in the first state (current flowing through the first sense resistor 58), for counting the number of periods in the second frequency signal 76 over an interval of the PWM signal 86 in which no current is flowing in the second sense resistor 64. The difference counter 78 further comprises a second up counter (low side counter) 126 responsive to the second frequency signal 76, wherein the low side counter 126 is reset at each period of the PWM signal 86. The count contained in the low side counter 126 is thus the total period count over the PWM cycle of the frequency 76, including both states of the PWM signal 86.

In a symmetrical manner, the difference counter 78 further comprises a third and fourth up counter 128 and 130. The third counter (high side offset counter) 128, is responsive to the first frequency signal 72 only while the PWM signal 86 is in the second state (current flowing through the second sense resistor 64), and thus receives only a zero-level offset frequency count. The fourth up counter (the high side counter) 128 counts the total number of periods in the first frequency signal 72 over an entire period of the PWM signal 86, and is reset at each period of the PWM signal 86. An output of the first, second, third and fourth counters (124–130) are combined at summer 132 to generate the output 82 of the difference counter 78 in order to compensate for a difference between the operating characteristics of the first and second oscillators 70 and 74. In this embodiment, the output of the low side offset counter 124 represents the zero-level offset in the second sense signal 68, and the output of the high side offset counter 128 represents the zero-level offset in the first sense signal 62. The output of the low side counter 126 represents the current sense measurement for the second sense resistor 64 plus the offset of the first amplifier 66, and the output of the high side counter 130 represents the current sense measurement for the first sense resistor 58 plus the offset of the first amplifier 60. The offset is cancelled by subtracting the outputs of the offset counters 124 and 128 from the output of counters 126 and 130 at summer 132.

Figure 4B:
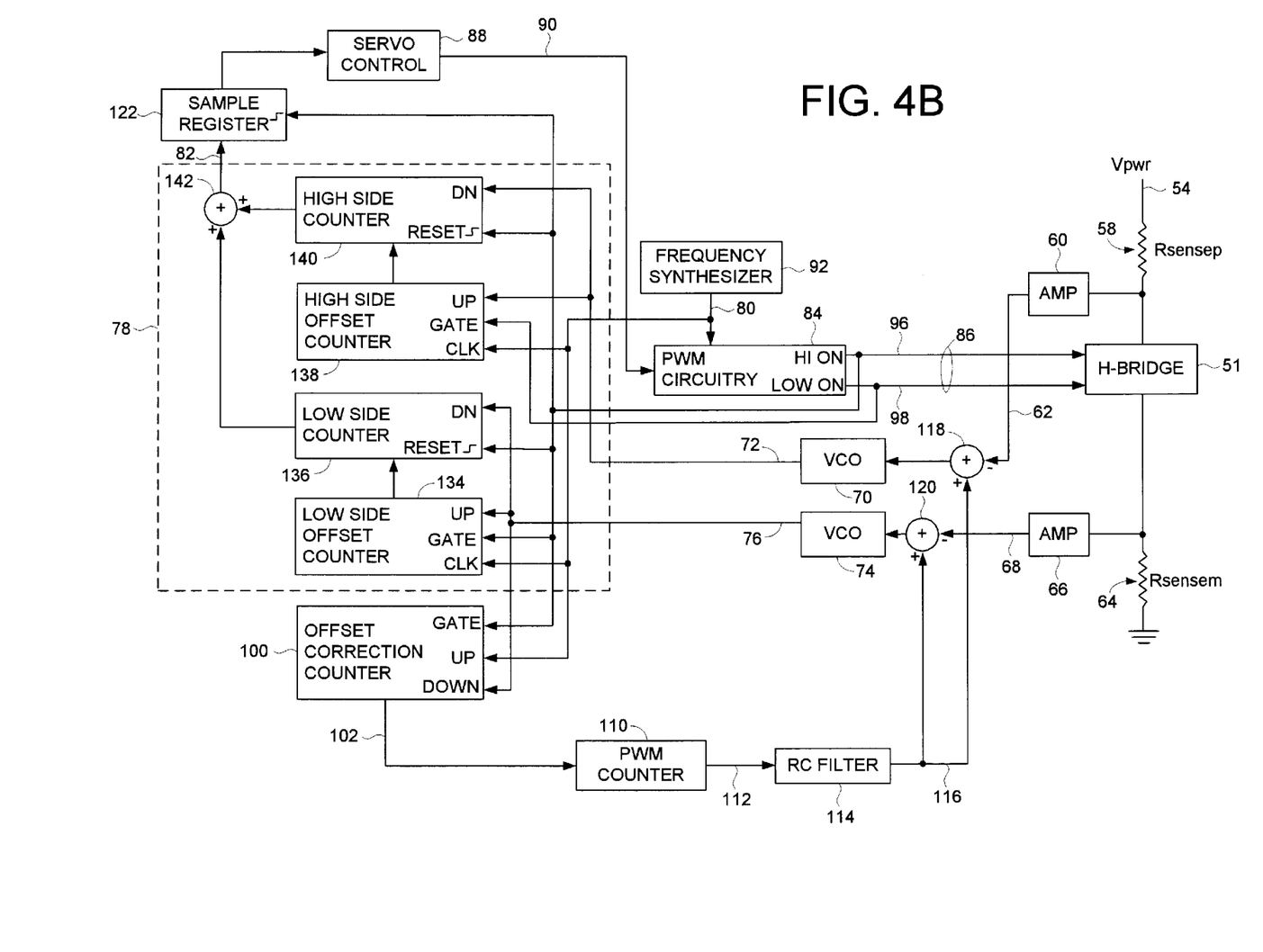

FIG. 4B shows an alternative embodiment for canceling the offset from the current sense measurement in a manner that compensates for the difference in operating and drift characteristics of the first and second oscillators 70 and 74. In this embodiment, the difference counter 78 comprises a first up counter (low side offset counter) 134 responsive to the second frequency signal 76 while the PWM signal 86 is in the first state (current flowing through the first sense resistor 58), the low side offset counter 134 for counting the number of periods in the second frequency signal 76 over a partial period of the PWM signal 86. The difference counter 78 further comprises a first down counter (low side counter) 136 responsive to the second frequency signal 76, wherein an output of the low side offset counter 134 is pre-loaded into the low side counter 136. The difference counter 78 further comprises a second up counter (high side offset counter) 138, responsive to the first frequency signal 72 while the PWM signal 86 is in the second state (current flowing through the second sense resistor 64), the high side offset counter 138 for counting the number of periods in the first frequency signal 72 over a partial period of the PWM signal 86. The difference counter 78 further comprises a second down counter (high side counter) 140 responsive to the first frequency signal 72, wherein an output of the high side offset counter 138 is pre-loaded into the high side counter 140. An output of the low side counter 136 and an output of the high side counter 140 are combined at summer 142 to generate the output 82 of the difference counter 78. In this embodiment, the output of the low side offset counter 134 represents the zero-level offset in the second sense signal 68 and the oscillator 74 offset frequency, and the output of the high side offset counter 138 represents the zero-level offset in the first sense signal 62 and the first oscillator 70 offset frequency. Loading the low side counter 136 with the output of the low side offset counter 134 and then counting down the periods of the second frequency signal 76 effectively subtracts the offset in the second frequency signal 76. Similarly, loading the high side offset counter 140 with the output of the high side offset counter 138 and then counting down the periods in the first frequency signal 72 effectively subtracts the offset in the first frequency signal 72.

Figure 5A:
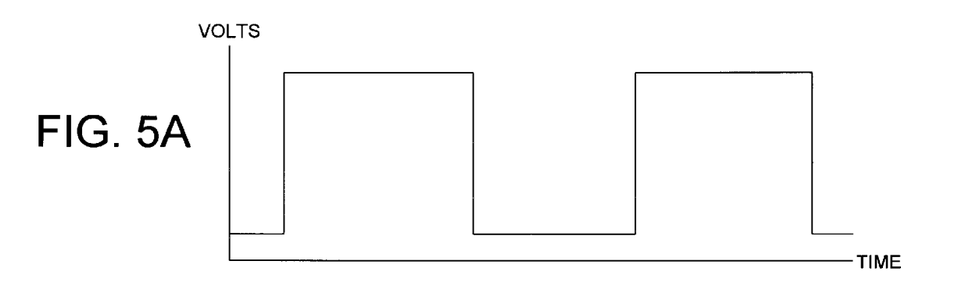
FIGS. 5A–5D are voltage waveforms illustrating the offset cancellation in the current sense measurement.
Figure 5B:
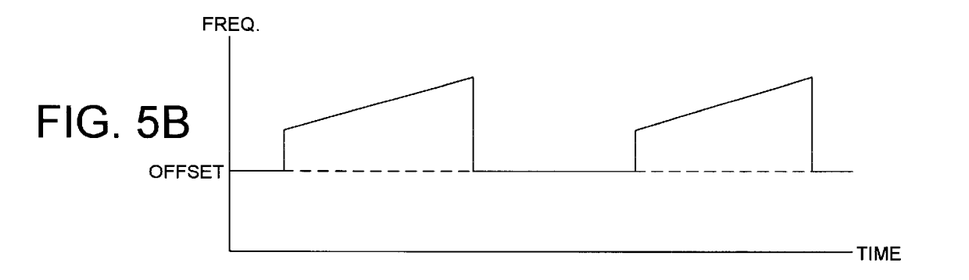
Figure 5C:
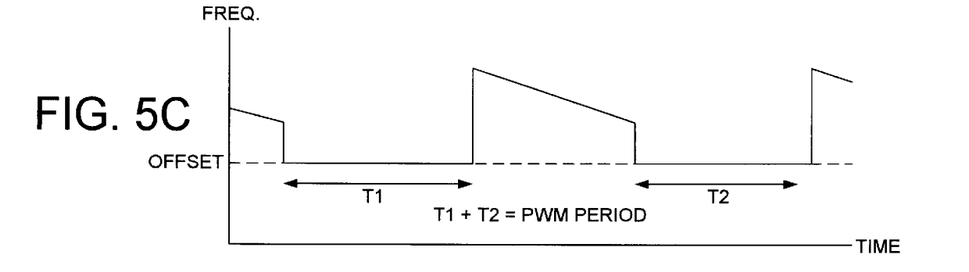
Figure 5D:
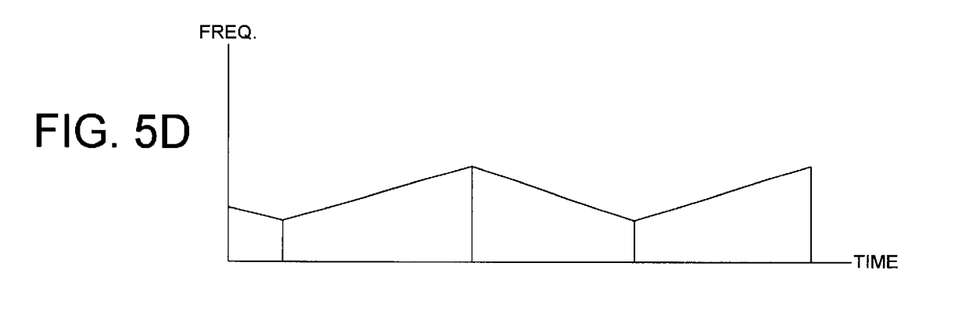

The low side offset counter 124 and high side offset counter 128 of FIG. 4A, and the low side offset counter 134 and the high side offset counter 138 of FIG. 4B operate only during the zero-level intervals for their respective frequency signals 76 and 72, and are reset after counting for a total interval equal to one period of the PWM signal 86, even though this may not occur on a single PWM timing cycle. This is illustrated in FIGS. 5A-5D. FIG. 5A shows the PWM signal 86, FIG. 5B shows the first frequency signal 72, and FIG. 5C shows the second frequency signal 76. Referring to FIG. 5C, the low side offset counter 124 of FIG. 4A is enabled during time interval T1 and time interval T2 which combined equal one period of the PWM signal 86. The output of the low side offset counter 124 is then subtracted from the output of the low side counter 126 after the low side counter 126 operates (uninterrupted) over an entire period of the PWM signal 86, thereby subtracting the offset from the second frequency signal 76. The resulting combined frequency signals with their offsets canceled is shown in FIG. 5D. The output of the sample register 122 is valid only at the end of the PWM cycle, and consists of a single number representing the area under the curve of FIG. 5D.

Figure 6:
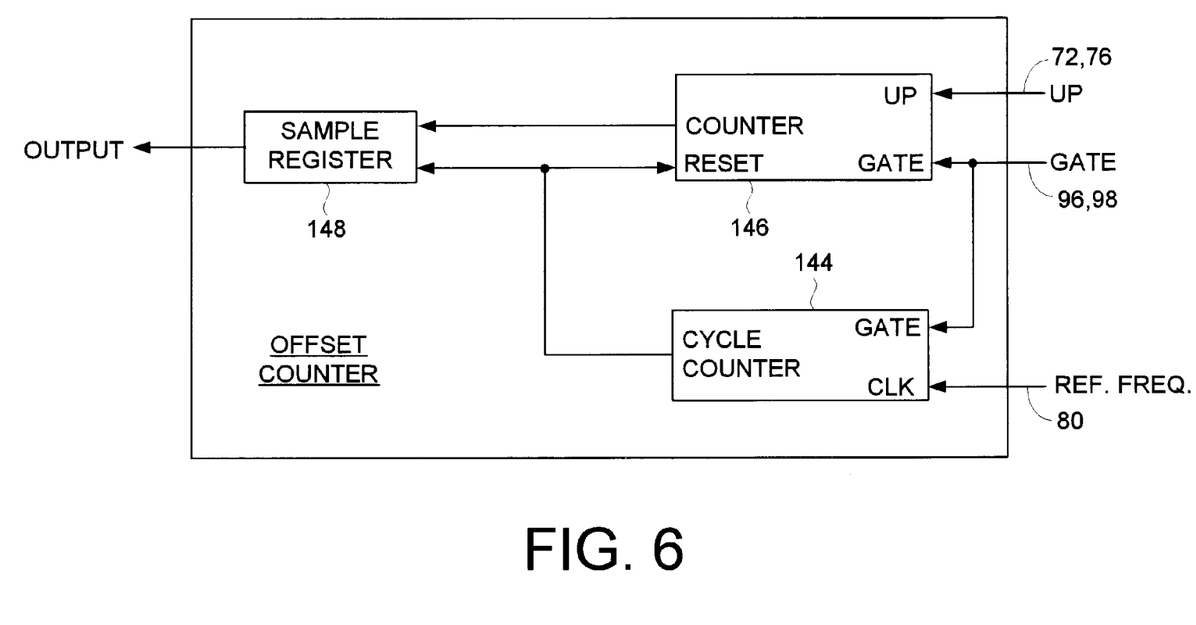
FIG. 6 shows suitable circuitry for implementing the sampled counters of FIGS. 4A and 4B.

FIG. 6 shows suitable circuitry for implementing the low side offset counter 124 and high side offset counter 128 of FIG. 4A, and the low side offset counter 134 and the high side offset counter 138 of FIG. 4B. The reference frequency 80 is applied to the clock input of a cycle counter 144 which counts a number of periods in the reference frequency 80 equal to a period of the PWM signal 86. An up counter 146 counts periods in the corresponding frequency signal 72 or 76, and the cycle counter 144 and the up counter 146 are enabled by the GATE signal 96 or 98. When the cycle counter 144 reaches terminal count, it loads the output of the up counter 146 into a sample register 148 and resets the up counter 146.

I claim:
1. A disk drive comprising:
(a) a disk;
(b) an actuator arm;
(c) a head connected to a distal end of the actuator arm;
(d) a voice coil motor (VCM) comprising a voice coil, the VCM for rotating the actuator arm about a pivot to actuate the head radially over the disk; and
(e) a VCM driver comprising:
an H-bridge driver comprising a plurality of driver switches for driving current from a supply voltage through the voice coil to ground;
a first sense resistor connected in series between the supply voltage and at least one of the driver switches;

a first amplifier for amplifying a voltage across the first sense resistor to generate a first sense signal;

a second sense resistor connected in series between at least one of the driver switches and ground;

a second amplifier for amplifying a voltage across the second sense resistor to generate a second sense signal;

a first oscillator for generating a first frequency signal in response to the first sense signal;

a second oscillator for generating a second frequency signal in response to the second sense signal; and a first counter responsive to a reference frequency, the first frequency signal, and the second frequency signal, wherein an output of the first counter represents a current flowing through the voice coil.

2. The disk drive as recited in claim 1, wherein the output of the first counter represents a difference between the reference frequency and the first and second frequency signals.

3. The disk drive as recited in claim 1, wherein the VCM driver further comprises pulse width modulated (PWM) circuitry responsive to the output of the first counter for generating a PWM signal for controlling the driver switches.

4. The disk drive as recited in claim 3, wherein:

(a) current flows through the first sense resistor and the voice coil while the PWM signal is in a first state;

(b) current flows through the second sense resistor and the voice coil while the PWM signal is in a second state;

(c) the first counter is responsive to the first frequency signal while the PWM signal is in the first state and to the second frequency signal while the PWM signal is in the second state;

(d) the VCM driver further comprises a second counter responsive to at least the first frequency signal while the PWM signal is in the second state; and (e) an output of the second counter is used to cancel an offset in the measured current flowing through the voice coil.

5. The disk drive as recited in claim 4, wherein the output of the second counter is used to adjust the first and second sense signals.

6. The disk drive as recited in claim 4, wherein the first counter comprises:

(a) a first up counter responsive to the first frequency signal while the PWM signal is in the second state, the first up counter for counting the number of periods in the first frequency signal over a period of the PWM signal;

(b) a first down counter responsive to the first frequency signal, wherein an output of the first up counter is loaded into the first down counter;

(c) a second up counter responsive to the second frequency signal while the PWM signal is in the first state, the second up counter for counting the number of periods in the second frequency signal over a period of the PWM signal;

(d) a second down counter responsive to the second frequency signal, wherein an output of the second up counter is loaded into the second down counter; and wherein an output of the first down counter and an output of the second down counter are combined to generate the output of the first counter in order to compensate for a difference between the operating characteristics of the first and second oscillators.

7. A method of operating a disk drive, the disk drive comprising a disk, an actuator arm, a head connected to a distal end of the actuator arm, a voice coil motor (VCM) comprising a voice coil for rotating the actuator arm about a pivot to actuate the head radially over the disk, and an H-bridge driver comprising a plurality of driver switches for driving current from a supply voltage through the voice coil to ground, the method comprising the steps of:

amplifying a voltage across a first sense resistor to generate a first sense signal, the first sense resistor being connected in series between the supply voltage and at least one of the driver switches;

amplifying a voltage across a second sense resistor to generate a second sense signal, the second sense resistor being connected in series between at least one of the driver switches and ground;

generating a first frequency signal in response to the first sense signal;

generating a second frequency signal in response to the second sense signal;

counting periods in the reference frequency, the first frequency signal, and the second frequency signal, to generate a first count representing a current flowing through the voice coil.

8. The method as recited in claim 7, wherein the first count represents a difference between the reference frequency and the first and second frequency signals.

9. The method as recited in claim 7, further comprising the step of generating a PWM signal for controlling the driver switches in response to the first count.

10. The method as recited in claim 9, wherein:

current flows through the first sense resistor and the voice coil while the PWM signal is in a first state;

current flows through the second sense resistor and the voice coil while the PWM signal is in a second state;

the first count is generated in response to the first frequency signal while the PWM signal is in the first state and to the second frequency signal while the PWM signal is in the second state;

the method further comprises the steps of:

(a) counting periods in at least the first frequency signal while the PWM signal is in the second state to generate a second count; and (b) canceling an offset in the measured current flowing through the voice coil in response to the second count.

11. The method as recited in claim 10, further comprising the step of adjusting the first and second sense signals in response to the second count.

12. The method as recited in claim 10, wherein the step of generating the first count comprises the steps of:

(a) counting up periods in the first frequency signal while the PWM signal is in the second state to generate a third count, wherein the counting up occurs over a period of the PWM signal;

(b) loading the third count into a first down counter for counting down periods in the first frequency signal to generate a fourth count;

(c) counting up periods in the second frequency signal while the PWM signal is in the first state to generate a fifth count, wherein the counting up occurs over a period of the PWM signal;

(d) loading the fifth count into a second down counter for counting down periods in the second frequency signal to generate a sixth count; and (e) combining the fourth and sixth count to generate the first count.

* * * * *